Nov. 18, 1969   G. A. HUSKY   3,478,773
IRRIGATION APPARATUS
Filed Nov. 21, 1968   4 Sheets-Sheet 1

GLOVER A. HUSKY
INVENTOR.

BY
Ely Silverman
ATTORNEY

Nov. 18, 1969　　　　　G. A. HUSKY　　　3,478,773
IRRIGATION APPARATUS
Filed Nov. 21, 1968　　　　　4 Sheets-Sheet 2

GLOVER A. HUSKY
INVENTOR.

BY

Ely Silverman
ATTORNEY

GLOVER A. HUSKY
INVENTOR.

BY

Ely Silverman
ATTORNEY

United States Patent Office 3,478,773
Patented Nov. 18, 1969

3,478,773
IRRIGATION APPARATUS
Glover A. Husky, Lubbock, Tex., assignor to Industrial Metalcraft Company, Inc., Lubbock, Tex.
Continuation-in-part of application Ser. No. 588,044, Oct. 20, 1966. This application Nov. 21, 1968, Ser. No. 786,528
Int. Cl. B05b *3/18;* A01g *25/00*
U.S. Cl. 137—344   6 Claims

ABSTRACT OF THE DISCLOSURE

A mobile irrigation apparatus for longitudinal and transverse traverse of land comprising a series of like wheeled stations with a continuous length of pipe firmly supported thereon and extending therebetween. Each station is powered with the greatest tractive force on the front wheel thereof during the motion of the station in a direction transverse to the length of the continuous length of pipe, and the wheels of each station are mounted for ready movement thereof to a position for drawing the apparatus parallel to the length of the pipe.

CROSS REFERENCE TO RELATED APPLICATIONS

This application is a continuation-in-part of my co-pending application Ser. No. 588,044 filed Oct. 20, 1966, and now abandoned, entitled "Irrigation Apparatus," referred to in patent office receipt transaction No. 40093B.

BACKGROUND OF THE INVENTION

The field of art

To which the invention pertains is fluid sprinkling or spraying apparatus comprising a series of joined fluid conductors having spray outlets and vehicular type support means secured thereto.

Description of the prior art

Self-propelled irrigation machines have provided controls for selective activation or deactivation of the total tractive force exerted on any one station in a series of like stations which station may be behind or ahead of the remainder of the stations in the series during an irrigation traverse of the field. These apparatuses require adjustment because of the strains put on such apparatus due to relatively rough terrain and the large distance (about 1300 ft.) from one end of such apparatus to the other. Additionally these controls have increased the complexity, weight and expense of such apparatus as well as the maintenance requirements therefor. Additionally each station in a continuously controlled system of series of such stations, each such station being firmly affixed to the header pipe as a control means for the activation and deactivation means, as in U.S. Patents 3,245,608 and 3,245,595, results in a sinuous orientation of the header pipe with portions of that header pipe and the stations affixed thereto being at varying angles to the direction of travel of the total header length, while that header pipe is moved transverse to its length. This creates undesirable axial movements and strains of the entire system of pipe and stations as well as skewing and tilting of the separate stations, notwithstanding the expense and complexities of such systems.

SUMMARY OF THE INVENTION

Figure 1:
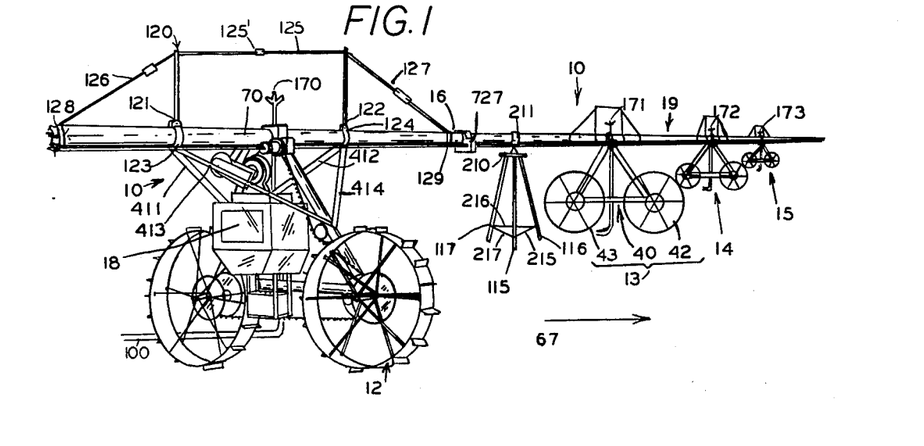
FIGURE 1 is a perspective view of one embodiment of the apparatus according to the invention during the motion thereof transverse to the length of its header pipe.

In each of the series of wheel mounted units forming the system of this invention the rigid character of the frame and the array and nature of the chain used therewith provide in both directions of travel of each wheeled station transverse to the pipe length, (i.e. to the right as shown in FIGURE 1 or in the opposite direction) for transmission of tractive energy from the system drive motor to the ground-engaging wheel of each station that is most advanced in the direction of travel thereof and so avoids skewing orientation of each such station at ao so avoids skewing orientation of each such station at an angle to the direction of travel of the pipe, avoids axial motion of the pipe, and, further, on such slippage as may result in loss of front wheel traction at a point where the front wheel meets a wet spot, the tractive force of that station is then transmitted automatically to the rear wheel of that station and, after such slippage, automatically returned to the front wheel.

Additionally, the mechanically powered drive system herein is linked to both of the ground engaging wheels of each station by a single clutch constructed and located on the drive shaft so as to be safely and readily manipulated for ready relase of both drive wheels of any one station for convenient forward and backward adjustment motion of that one station relative to the others.

Figures 10, 11:
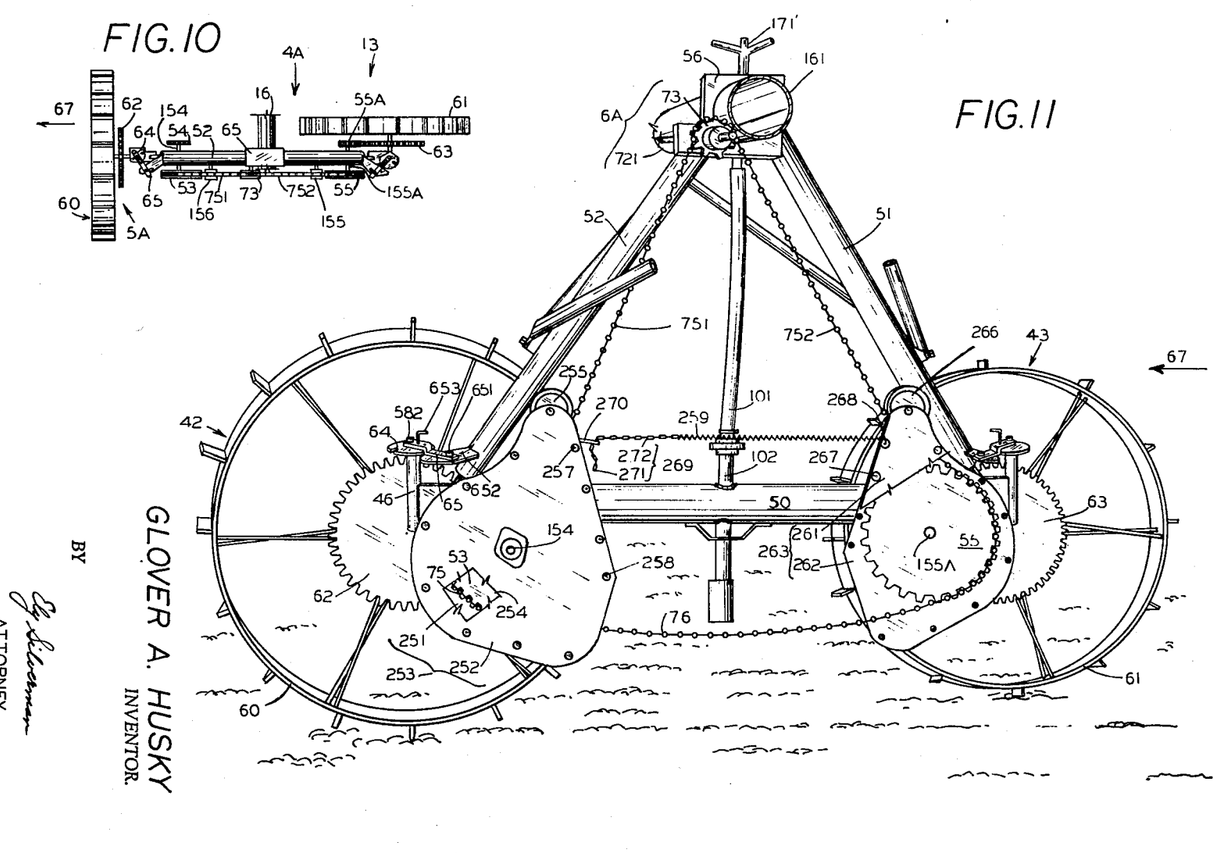
FIGURE 10 is a top view of the station shown in FIGURE 4.
FIGURE 11 is a perspective partially broken away view of a modified form of the apparatus 13 shown in FIGURE 4 when in the position of station 13 in an array of such wheeled stations as shown in FIGURE 1 and as seen from the position of station 14 in such array of such stations.

In the apparatus shown in FIGURE 11 skirt assemblies 253 and 263 are respectively rotatably supported on shafts 154 and 155A for the pinions 54 and 55A of the sprocket wheels 53 and 55. These assemblies 253 and 263 are mirror images of each other. The apparatus shown in FIGURE 11 is otherwise the same as shown in FIGURES 1 through 10.

DESCRIPTION OF THE PREFERRED EMBODIMENTS

The apparatus, generally indicated as 10, comprises a plurality of generally like wheel unit stations as 12, 13, 14, 15, a header pipe 16 supported on and attached to said stations, a motor 18, a drive shaft subassembly 19, and sprinkler subassemblies as 171' attached to and supported on said pipe.

Figures 3, 4:
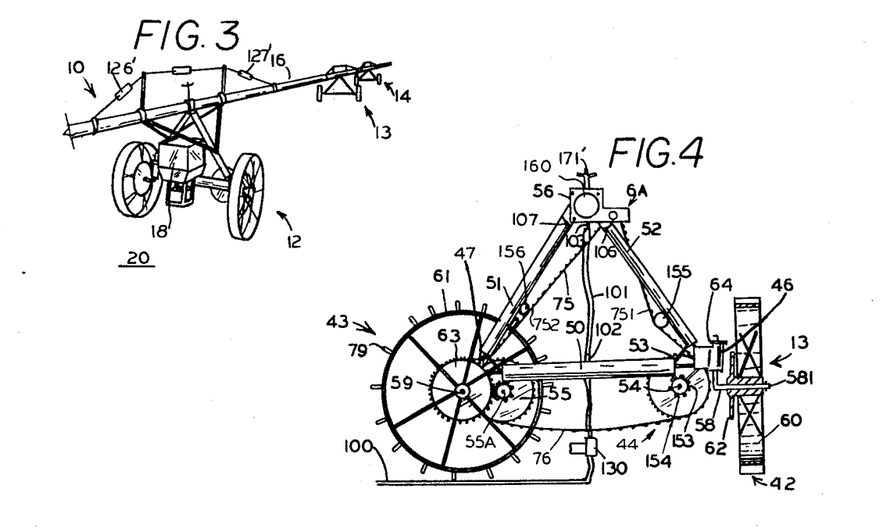
FIGURE 3 is a perspective view of the apparatus of FIGURE 1 during its motion parallel to the length of its header pipe.
FIGURE 4 is a side view of one whel unit station 13 of apparatus of FIGURE 1 showing, for purposes of illustration, one whel thereof set for rotation in a plane and motion in a direction transverse to the length of the header pipe, and the other wheel shown, for purposes of illustration, in its position for rotation in a plane and motion in a direction parallel to the length of the header pipe. The figure shows the apparatus 13 as seen from station 12 in the array of units shown in FIGURE 1 and along direction of arrow 4A of FIGURE 10 and is drawn substantially to scale as shown by the hereinbelow specifically recited dimensions for the larger portions thereof.

In operation the apparatus 10 moves across a field shown as 20. The apparatus 10 moves in a series of successive short movements with the wheel of its wheel units rotating in a plane transverse to the length of the header pipe 16 from the position shown at 21 transversely to the length of the pipe to a position as 22 at the far end of the field. It stops at each of a series of intermediate positions therebetween 32. At an "end of field" position 22, the wheels of each of the stations as 12–15 are rotated to a position generally as shown in FIGURE 3 with the planes of the wheels parallel to the length of the header pipe 16. In this position the apparatus 10 is towed by a tractor 88 from the position 22 at one side of the field to the position 23 at a distance from the first position. The apparatus 10 is then moved there from to one of a series of intermediate positions, as 31, by the motor 18 and drive shaft subassembly associated therewith to the position 24.

During the travel of the apparatus 10 from the position 21 to 22 and from the position 23 to 24, a source of water as a conventional well and pump 26 and is connected as by a flexible hose line 27 to a coupling and valve as 30 at one, or 301 at the other end of the apparatus 10. Thereby water is applied to the apparatus 10 at its various stationary positions during its motion along across the field 22. The header 16 and conventional trail lines attached thereto are provided with various drain points regularly spaced therealong to provide for convenient and ready removal of the water from the apparatus prior to its motion. Accordingly, after the apparatus at one position has distributed a desired amount of water to one area of field 20 by the sprinkler attachments attached to the header pipe and/or trail lines the apparatus 10 is moved from that one position to another whereat the area of water coverage effected by the apparatus 10 overlaps the area covered by the sprinkling effective in its prior position.

The apparatus 10 is emptied of water prior to its moving from one position to another during its travel over the field from position 21 to 22 and from position 23 to 24 as well as from position 22 to 23.

In the preferred embodiment each station as 13 comprises a frame subassembly 40, a front wheel subassembly 42, a rear wheel assembly 43, and a gear wheel chain and drive assembly 44.

Figure 2:
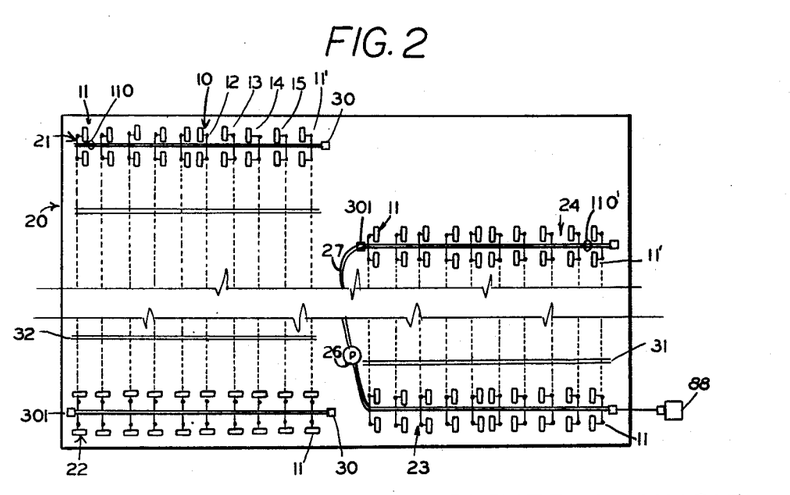
FIGURE 2 is an overall diagrammatic view of the paths taken by the apparatus of FIGURE 1 in travel thereof over a field and diagrammatically shows the mirror image relations of wheels and frames on the stations on opposite sides of the middle of the apparatus 10.

The mirror image relation of wheels and frames in the stations as 13, 14 and 15 on one side of the center of apparatus 10, relative to the otherwise similar stations on the other side is diagrammatically shown in particular for end stations 11 and 11' in FIGURE 2.

The frame subassembly 40 is flat and rigid. It comprises a rigid straight horizontal tubular member 50 and front and rear vertically extending sloped straight members 52 and 51. End castings 46, 47 at the lower front and rear corners provide for firm connection of the horizontal member to the vertical members. A rigid header member 56 firmly holds members 51 and 52 and adjacent lengths 161 and 162 of header pipe 16.

The frame firmly supports assembly 44 which comprises a first drive sprocket as 73 in its journal, a front driven sprocket 53 in its journal, and a rear driven sprocket 55 in its journal. The sprockets rotate in a plane parallel to the plane of the frame and are firmly rotatably located in journals on the frame by axles rotatably fixed to the journal in the frame. The axles of sprockets 53 and 55 in turn are firmly fixed to a front pinion gear 54 and a rear pinion gear 55A respectively.

The vertical portion of L-shaped axle members 58 in front and 59 in rear are each firmly and rotatably located in castings 46 and 47 at the front and rear of the frame. A front wheel 60 is rotatably located on the horizontal arm 581 of its axle 58 and a similar rear wheel 61 is located on the horizontal portion of its corresponding axle. A front wheel sprocket gear plate 62 is firmly supported on and attached to the wheel 60; this gear plate is toothed and engages the corresponding pinion gear 54 in the position of parts shown in FIGURE 1, (and a corresponding plate 63 is correspondingly supported on and attached to the wheel 61).

A rigid front wheel control plate 64 is firmly attached to the vertical portion 582 of the axle 58 and rotates therewith. A rigid positioning arm 65 is attached to axle 58 and may be firmly attached to a slotted adjustment plate 652 by an adjustment screw and nut 651. Plate 652 is fixed to arm 52. A rigid pin 653 removably yet firmly fits into arm 65 and plate 64. An assembly as arm 65, plates 64 and 651 and associated parts for the front wheel 60 is provided for the rear wheel as 61 and the same assembly is provided for each wheel station of apparatus 10. Each such assembly provides for holding the wheel as 60 either in a position transverse to the length of the header pipe or in a position parallel thereto. The adjustable nut 651 provides for fine adjustment of this location of the wheel.

Figures 5, 6:
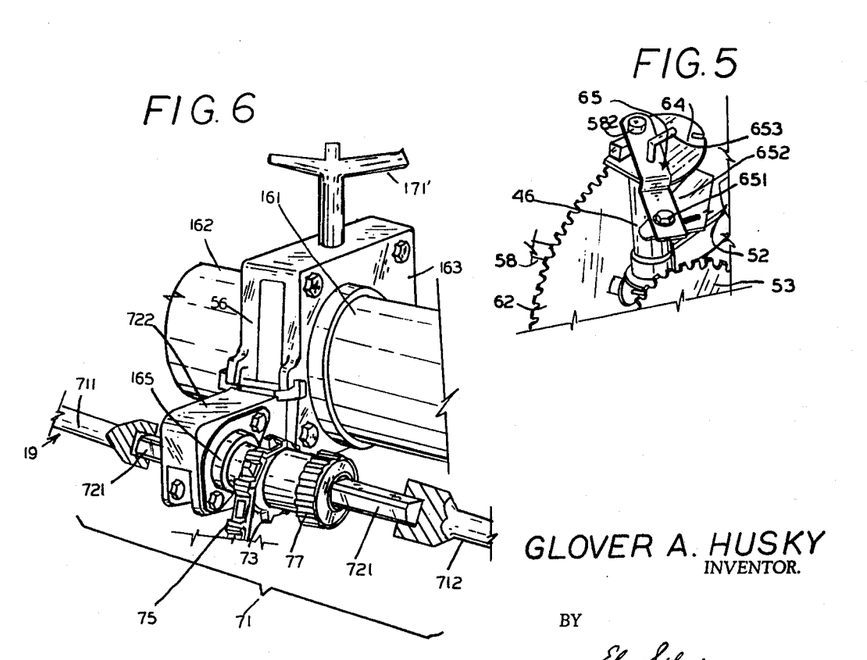
FIGURE 5 is an enlarged view of details of a position control plate for wheel 60 in the position thereof shown in FIGURE 4 and as seen along direction of arrow 5A of FIGURE 10.
FIGURE 6 is an enlarged view of the clutch mechanism in zone 6A of FIGURES 4 and 11.

The motor 18, a gasoline engine, is supported on the frame of one of the stations as 12 preferably near to the center of the apparatus 10. Generally there will be some 26 stations, each spaced 50 feet apart for a 1300 foot spread of the entire apparatus 10. The motor 18 is operatively connected through a conventional clutch as 70 to a drive shaft assembly 19. Assembly 19 is composed of a series of serially connected drive shafts as 711 and clutch shafts as 721. Each drive shaft portion as 711 and 712 is supported on a clutch shaft as 721. Such clutch shaft portion 721 has a square sectioned end. Each shaft as 711 and 712 has a corresponding recess to drive and/or be driven by the portion of shaft 721 that fits thereinto, as shown in FIGURE 6.

Each shaft portion as 721 is firmly yet rotatably supported on a journal as 722 therefor on each frame as 40.

Each clutch shaft as 721 is provided with a drive sprocket wheel as 73 which is located with a plane of rotation thereof in the same plane as the sprocket wheels 53 and 55 for such frame. The wheel 73 is connected by a chain belt drive as an Appleby chain, 75, to wheels 53 and 55.

Each plate as 64 on each frame as 40 provides for holding the adjacent wheel as 60 in a position whereat the pinion as 54 of the driven sprocket wheel 53 will engage the gear plate 62 when desired, as shown in FIGURES 1 and 4. Similar relations occur for the rear wheel.

A releasable clutch assembly 77 is supported on the clutch shaft 721 for each station, as 13. This releasable clutch provides for each station that, as herebelow described, release thereof provides for functional release of the clutch shaft as 721 from the drive sprocket wheel as 73 and sprocket plates as 53 and 55. Thereby connection of the power transmission to both ground-engaging wheels of any single station of apparatus 10 is released on one clutch release motion and the mechanical drive or power train of any one station as 13 may be disconnected without affecting the connection of any of the other stations as 12, 14, and 15 to the motor 18.

As each of the stations as 12–15 are relatively light (160 lbs.) this permits that the operator may, during the operation of this apparatus, release the connection of any one station as 13, move that one station forward or backward, and then put the clutch 77 back in engagement with the other engaged elements of the drive shaft assembly 19 and move all elements of the apparatus 10 in an aligned manner.

In the preferred embodiment, the drive wheel 73 has 8 teeth, the sprocket wheels 53 and 55 each have 42 teeth, the pinions 54 and 55A each have only 10 teeth and the sprockets 62 and 63 each have 60 teeth and has a diameter of 16" when the wheel 60 has a 42" diameter. As the clutch 77 is located on the drive shaft prior to any particular speed reduction (the speed reduction is accomplished from the sprocket 73 to the pinions 54 and 55A), the drive shaft assembly 19 operates at a relatively high rotataive speed but at a low torque; this lowers the mechanical stress and wear on that clutch mechanism. A reliable yet light and readily controlled structure is thereby provided.

The motor 18 is a conventional 7 horsepower gasoline motor which is connected by a conventional clutch for purposes of starting and stopping the entire machine 10. The chain transmission on each station transmits power from the drive shaft assembly 19 via toothed gear plates as 62 and 63 to the ground-engaging wheels as 60 and 61 only in that position of the ground-engaging wheels wherein they rotate in a plane transverse to the length of the elongated header pipe 16 and engage their pinions as 54 and 55A. There is no transmission of power from motor 18 to wheels as 60 and 61 when the apparatus 10 is moved parallel to the length of the pipe 16, as from the position shown as 22 to that shown as 23 in FIGURE 2. This movement is regularly powered by a tractor or truck 88 which is usually available at the farm and connected to the end station, as 11', by a cable.

The header member 56 is a thick and rigid casting. In the preferred embodiment it is 3 inches thick. It has a body provided with a left pipe engaging face (as shown in FIGURE 6) and a similar right hand face and a pipe orifice 160 therethrough. A clutch shaft journal box 722, a front leg seat 106, and a rear leg seat 107, all attached together to the body as an integral casting. The same structure is provided each of the wheel units as 11–15.

The sections of pipe 161 and 162 are each firmly held to the front and rear faces, respectively, of the header member 56 by collars as 163 which are firmly held together through the holes provided therefor in the header member 56. The pipe sections communicate through openings 160.

Rigid legs 52 and 51 are firmly fixed to seats 106 and 107, respectively. The castings 46 and 47 are also thick and rigid and are firmly connected to the rigid member 50. In the preferred embodiment, member 50 is a 3½" O.D. rigid aluminum tubing while legs 52 and 53 are 3" O.D. aluminum tubing. Thereby the frame 40 is a rigid yet light structure. Because of the integral structure of the header member 56, the box 722 is firmly aligned with respect to the pipe sections as 162 and 161 as well as with the frame 40.

Drive bearings as 165 for shaft 721 are firmly fixed to the journal box walls and thereby align the shaft as 721 with respect to the frame 40.

The castings 46 and 47 are also thick and rigid. They are firmly connected to the rigid member 50 and each is provided with a housing 153 for a pinion shaft as 154 which shaft is attached to the sprockets 53 and the pinion 54. Thereby the sprocket 53 is firmly located with respect to the members 50, 51, and 52 which rigid members are firmly attached to each other by the castings 46, 47, and 65. This description applies also to a similar structure for the rear wheel 61 as the casting 47 is a mirror image of casting 46. Similar structures are provided at all the other stations.

Thereby the alignment of sprockets 53, 55 and 73 is extremely firmly assured. There is also included within the scope of this invention some guide wheels as 155 and 156 which are rotatably supported on members 52 and 51 respectively to align the chain 75 with the teeth of the wheels 53 and 55.

The conduit 102 is firmly fixed to the member 50 and extends vertically therethrough. This location on the conduit 102 provides that a trail tube line may extend therefrom (by a rotatable T located between 3 and 6 inches over the ground) to one side of the adjacent wheel whether 60 or 61, inasmuch as each such wheel (as shown in FIGURE 4 which is drawn to scale) is displaced from the center axis of the frame 40 by a distance equal to the distance from the center of that wheel to the center of the vertical portion 582 of the axle 58.

This extremely rigid fixing of the axes of the drive sprocket 73 and the pinion shaft 154 for pinion 54 and of the shaft 155A for pinion 55A provides that, not withstanding any sagging or bending of portions of the drive shafts as 711 and 721 adjacent any particular clutch shaft portion as 721, that the portion 721 maintains its alignment with the sprocket wheels with which it is connected by the chain 75. Accordingly, although there may be variations in alignment of 40 inches (in 50 feet) there is no twisting of the shaft 721 relative to the frame 40. Accordingly, the relationships of tightness and connection between the pinion 73 and the sprocket gear sprocket plates 53 and 55 is not varied during operation of the apparatus notwithstanding displacement of one of the stations relative to another or the height of one station to another during the operation of the apparatus 10. The relations of the pinion shaft 721 and pinion 73 and the plates 53 and 55 provide that the chain 75 is most tight on the wheel which is toward the front of the apparatus 10; that is, in motion from left to right as shown by direction of arrow 61 in FIGURE 1, the portion of chain 75 which passes from the sprocket wheel 73 is tightest in passing from sprocket 73 to sprocket gear or plate 54, the "front wheel" sprocket. There is some looseness of the chain in passing from sprocket 53 to sprocket 55 and even greater looseness in passing from sprocket 55 to sprocket 73 in motion as shown by 67. The above-mentioned slack between wheels 53 and 55 provide that, on motion of a station as unit 13 as shown by arrow 67 in FIGURE 1, sprocket 73 pulls wheel 53 via chain 75 and, inherently, concurrently passes chain downward to sprocket 55; as portion 76 is slack no substantial tractive force is thereby then passed by or along chain 75 to sprocket 55 (and "rear" ground-contacting wheel 61); wheel 61 then rolls along the ground at the same speed as wheel 60, pulled by the frame member 50 which is pulled by wheel 60, and the slack remains. On reverse motion ground contacting wheel 61 is the pulling "front" wheel and wheel 60 is the non-pushing (except when 61 slips) "rear" wheel; accordingly, the slack in the chain between wheels 53 and 55 is simply not taken up and tractive force is continuously selectively applied to the "front" wheel so long as it has any traction. While the wheel 60 could slip on muddy ground, as there would then be no front ground resistance, after slack is taken up by sprocket 73 (in mud) tractive force would be transmitted by portion 76 of chain 75 to the rear wheel 61. However, over dry land, which the apparatus 10 would contact after it had passed over the wet land there would again be greater tractive force at the "front" (sprocket 53 and) wheel 60 as sprocket 73, actuated by drive shaft assembly 19 via its clutch assembly, as 77, again pulls on chain 75, and again applies tension thereto, which tension is selectively applied to "front" wheel 60 via its sprocket 53.

Accordingly, the greatest tractive force is applied to the front wheel 60 and the front wheels pull the apparatus 10 rather than the rear wheels pushing it because the chain 75, which has a definite amount of elasticity and a stretch therein provides for transfer of the maximum tensile stress and rotative stress to the front wheel rather than to the rear. This pulling of the segments of apparatus rather than a pushing thereof serves to minimize any skewing which might be obtained as when there is an attempt to push. The wear on the components of the machine is equalized because, while wheel 60 may be the "front" wheel in moving from a position as 21 to a position as 22, after movement of the apparatus 10 to the position 23, the wheel 61 will then be the "front" wheel in movement of the apparatus 10 from the position 23 to the position shown in FIGURE 24.

Trail lines as 100 may be provided. These are operatively connected to the pipe 16 via rigid conduits as 103 affixed firmly to frames as 40 at 56. A flexible conduit element such as a hose 101 is attached to bottom of 103 and connected to the top of a coupling 102 which is firmly fixed to the member 50 on frame 40. Thus frame 40 bears the load of pulling the trail line as 100. This avoids that the conduit 101 act as a lever to transmit pull from the trail tube to the pipe 16. To the contrary this structure puts the torque due to the drag of the trail line directly onto the vehicle as 13 and thereby minimize any rotative stress on the pipe. Accordingly, this structure avoids providing any twisting torque to the pipe 16.

Each frame as 12 has a plurality of rigid outrigger arms such as left rear arm 411, right rear arm 412, left front arm 413, right front arm 414 on frame of station 12. One, lower, end of each such arm is firmly attached to the station frame at two spaced apart points. In the preferred embodiment, the height of one point of such attachment of the lower end of such rigid outrigger arm is above the height of the outer surface of the portion of the wheel adjacent thereto in the position of the wheel for motion transverse to the length of the pipe, the height measured in a vertical plane parallel the pipe 16 and passing through that point of attachment. At the same time the point of attachment the location of the lower end of the outrigger arm as to frame 40 is below the level of the top of that wheel as shown in FIGURE 1, the other end of each of said outrigger arm is firmly attached to the pipe 16 and also to another outrigger arm; more particularly the left rear arm 411 and the left front arm 413 are joined to each other and are also joined to a clamp 123 which is firmly attached to the pipe 16. Similarly the pipes 412 and 414 are firmly joined to each other at their upper ends and also to a clamp 124, which like 123, encircles and is firmly attached to the pipe 16. This provides that there is no bending of the conduit 16 between the points at which the outrigger arms are clamped thereto.

Cantilever supports as 120 for station 12 are provided for each of the like stations 11–15 of the apparatus 10. Each of these cantilever supports comprises a vertical left arm 121 and a vertical right arm 122 for that station these being firmly attached to pipe 16 through clamps 123 and 124 respectively.

A steel ⅛" x ¾" strap having a left portion 126, a right portion 127, and a central portion 125 is attached at its ends to pipe cantilever clamps 128 and 129. These straps are each firmly attached to the pipe 16 at points removed about 15 feet from the frame 40. This provides that when there is no water in the pipe 16 the center of the pipe between station spaced apart 50 feet is raised up about 3" above the vertical location of the pipe in the header member 56. There is usually 58 inches between the bottom of the pipe 16 and the ground when the pipe is not loaded. Adjustment for length in strap portions 125, 126, 127 is made by turnbuckles 125', 126', 127' located along the length of such strap portions.

The weight of the water in six inch internal diameter aluminum pipe (.054" wall thickness) with fifty feet between stations is approximately 500 lbs. When the apparatus 10 is loaded with water, the maximum vertical downward deflection is only three inches when cantilever supports and straps as 120–129 are provided on each station. This facilitates the unloading of the water in the pipe through the drain 130 at the bottom of the conduit 102 when it is desired to empty the line 16.

The tooth clutch 77 comprises, in operative combination, the clutch shaft 721, a toothed sleeve portion 179, spring 150, locking plate 146, and a toothed sprocket 73.

The shaft 721 is a rigid solid steel shaft. It has two square portions 140 and 141 and a cylindrical portion 142. The diameter of the cylindrical portion 142 is only slightly (about 2%) less than the minimum (side-to-side) diameter of the square section 141 although substantially (about 30%) less than the maximum (diagonal, corner-to-corner) diameter of the section 141.

Sleeve 179 is a rigid hollow cylinder with a central hole to slide on shaft 721 and teeth to engage sprocket 73. Sleeve 179 comprises a rigid shell 170, a diametrical plate 171, and gear teeth as 174 and 175 all firmly joined together. Center plate 170 is a rigid metal plate that is firmly attached to and extends diametrically across the interior of sleeve 170.

Center plate 171 has a central hole 172 therein which has an exterior outline which matches smoothly the square 140 portion of the shaft 721. A tooth chamber 176 bounded by shell 170 and plate 172 is located on one side of the plate 171. A plurality of a gear teeth as 174 and 175 are firmly attached to the interior of shell 170 in that chamber. On the other side of the plate 171 is a spring chamber 173 in which chamber is located a locking plate 146 and spring 150.

The square portions 141 (left) and 140 (right) are of the same cross section size. Cylindrical portion 142 is between 141 and 140. A shoulder 178 is located between portions 142 and 140. Portions 140, 141, 142 are coaxial and firmly joined together.

Figure 7:
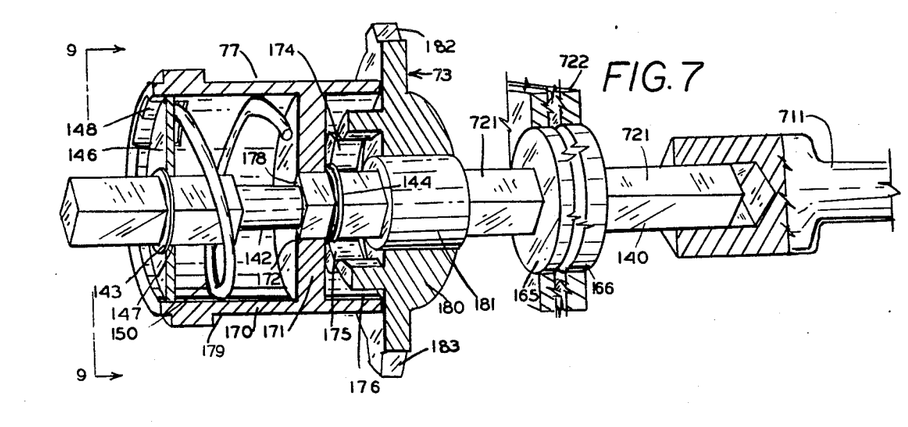
FIGURE 7 is a broken away diagrammatic view of the clutch to show the interior relations thereof during engaged position of the parts thereof.
Figure 8:
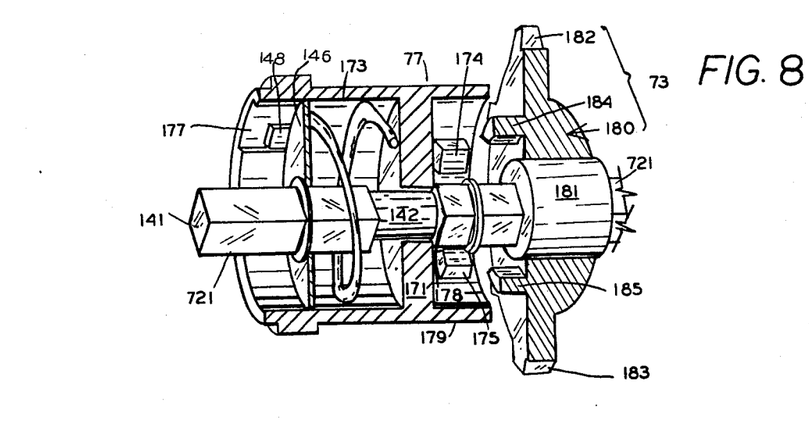
FIGURE 8 is a broken away diagrammatic view of the clutch to show the interior relations thereof during disengaged position of the parts thereof.
Figure 9:
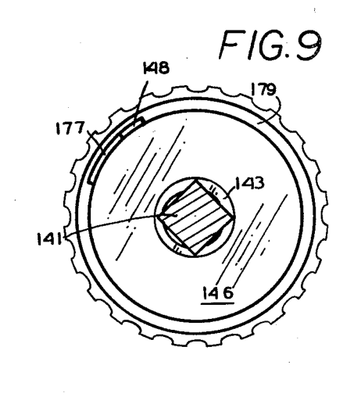
FIGURE 9 is an end view along section 9—9 of FIGURE 7.

A rigid locking plate 146 has a central hole 147 therein which fits smoothly over the rectangular portion 141 of the shaft 721. Plate 146 is held in place against movement to the left (as shown in FIGS. 6, 7, and 8) by a snap ring 143 affixed to a groove in shaft 721. A spring 150 located in the spring chamber 173 of the sleeve 179 (left end as shown in FIGURES 8 and 7) is pressed against the plate 146. The right end of the spring is pressed against the plate 171. Thereby the spring 150 urges the plate 171 to the right. This urging is limited by the snap spring 144.

The locking plate 146 has an ear 148 which fits into a locking plate recess or slot 177 on the sleeve 170.

The sprocket 73 comprises a tooth plate 180 and a bearing 181. The plate 180 is rotatably supported on bearing 181. The bearing is rotatably yet firmly mounted on the shaft 721. Snap rings fix it against longitudinal motion along the length of shaft 721 and the plate 180 is longitudinally fixed yet rotatably located on bearing 181 while not being displaced along the length of the shaft 721. The plate tooth plate 180 has a plurality of exterior chain engaging sprocket teeth as 182 and 183 which serve to engage and drive the chain 75. The tooth plate 180 also supports a plurality of interior teeth as 184 and 185 which serve to engage with and disengage from the teeth 174 and 175.

In the engaged position of the clutch the sleeve 179 is moved to the right by the spring 150 which urges the plate 171 to the right (right as shown in FIGS. 6–8). At this position the sleeve teeth as 174 and 175 engage the sprocket wheel interior teeth as 184 and 185 on the tooth plate 180 and the drive sprocket wheel 73.

To release the clutch assembly sleeve 179 is moved to the rear (leftwards in FIGS. 7 and 8) and the square hole 172 in the plate 171 is thereby moved to the rear of the shoulder 178 (between the rectangular portion 140 and the cylindrical portion 172). A 45 degree rotation of the sleeve 179 with respect to the shaft 721 is then made and causes the minor diameter, i.e. the distance across the square edge of the hole 172 to engage with the shoulder 178 of the shaft 721. In this position (FIGURE 8) teeth as 174 and 175 are removed from engagement with the teeth 184 and 185. In this position plate 180 of the sprocket wheel 73 may rotate freely about its bearing 181. The ear 148 of plate 146 is fixed in the slot 177 so that it does not rotate further counter-clockwise (as seen from the left of FIGURE 8) and there is then no further such rotation of the sleeve 179 with respect to the shaft 721 as might release the engagement of the plate 171 with the shoulder 178 and cause engagement of the clutch.

When the clutch assembly is to be reengaged the sleeve 179 is rotated clockwise (as seen from the left of FIGURE 8) and the then square shape of the square hole 172 is brought into alignment with the shaft 140 of similar size and shape of the shaft 721. The spring 150 expands against plate 146 and forces the plate 171 to the right and the teeth as 174 and 175 again engage teeth 185 of the drive sprocket wheel 73. When shaft 721 is rotated by shaft 711 or 712 the plate 171, sleeve 179, teeth 174, 175, 184, 185 and sprocket plate 180 rotate therewith and, with chain 75 actuate sprockets 53, 55, pinions 55A, 54 and wheels 60 and 61.

The very rigid three point attachment of the pipe 16 to each of the frames as 40 and the outriggers thereof maintains the orientation of the wheels as 60 and 61 of each such frame in a plane normal to the longitudinal axis of the pipe 16 during travel as shown in FIGURE 1. The firm yet rotatable support of the shaft as 721 in the box 722 (which box is herein provided for as an element rigidly attached to the frame 40) provides that there is no twist of the axis of sprocket wheel 73 notwithstanding upward, downward, rearward, or forward displacement of one station as 14 and/or 12 relative to a station as 13 between those stations. Further, the attachment of the elements of the drive shaft as 711 and 712 to the shaft 721 allows longitudinal motion of those shafts relative to 721 and further avoids any twist of the shaft 721 and movement of the axis thereof with respect to the axes of the shafts of wheels as 53 and 55 on the same frame. Accordingly, as the longitudinal axis of each of the pivot wheels as 73 is not displaced notwithstanding relative motion of one station as 13 relative to its adjacent stations as 14 and 12, and there is slight extensibility of the chain 75 and, practically, absolute rigidity of the frame 40, traction is always applied from motor 18 by subassembly 19 to the "front" wheel, i.e. to that wheel which is forward in the direction of the motion of the apparatus when the apparatus is moving in a direction transverse to the pipe 16 as above described.

This apparatus provides no means for automatically selectively stopping or moving one station which may be rearward of another during a motion as shown in FIGURE 1. This is because the flexibility of the pipe 16 readily permits a 40" displacement of any one station out of line with its adjacent stations, i.e. station 13 could be 40 inches to the rear of stations 12, and 14 during a motion shown in FIGURE 1 without any deleterious effects in the normal course of operation. Such a displacewheels of the stations are maintained in a line of travel that is in a plane normal to the length of the pipe 16: this orientation is strictly provided for by the apparatus of this invention and is secured and maintained by the drive action of the front wheel.

Brackets as 727 are provided on and firmly attach to pipe 16 intermediate the station as 12 and 13. They support bearings and those bearings provide rotatable support for each drive shaft rods as 711 between the stations.

To reduce the effect of the weight of water in the apparatus, a plurality of intermediate stations support elements as 110 and 110' are provided (for purposes of illustration one such support element is shown in FIGURE 1.)

Such support 110 comprises three weight bearing legs 115, 116, 117, a top plate 210 and narrow braces 215, 216, 217 which position the bottom of the legs apart from each other and can serve as a ground engaging surface.

The plate is pivotally attached to a clamp 211 on the pipe 16. The legs are attached at their top to the plate 210. It is preferred that a tripod be located only near each of the end stations as 11 and 11' because of the lack of counterbalancing pipe weight laterally of such stations.

It will be noted that the tripod does not have a ground-engaging foot on the bottom thereof but the braces are actually spaced away from the bottom thereof for greater stability to position the legs relative to each other as well as provide ground engaging surface. For convenience in transport (especially as pipe 16 is held in a slightly raised position when empty, as above described and the apparatus 10 is moved only when empty) the support element 110 is not sufficiently long for the bottom thereof to reach the ground but is so wide that slight reverse movement of the body does not move the pipe onto or off from the legs when the support is in operative position.

The distance from one tripod as 110 to adjacent stations, need not be the same and tripods need not be provided to adjacent stations.

In operation it is usual that the operator inspect and make minor adjustments of the apparatus prior to turning the water on. In the preferred embodiment the brace is located at a substantial distance (3"-6") from the bottom of the tripod legs. The braces 215, 216, and 217 are spaced away from the bottom of each leg to avoid that the tripod slide in a muddy field while the point of the legs project below the bottom of the braces to adequately affix the legs in position against the oscillatory reaction of the sprinklers and/or the intermittent thrust of the wind against the spray of water produced by the sprinklers attached to the pipe 16.

As shown in FIGURE 2 it will be noted that the wheels of the subassemblies as 11–15 are located toward the center of apparatus 10; i.e. for any one station the wheels are located centrally and the frame laterally about the center of the entire apparatus 10 to counter the deflection due to water and pipe weight.

In the preferred embodiment the lower end of each arm as 411–414 is firmly attached to the frame 40 about 20 inches below the pipe 16 and 18 inches front or rear of that pipe: the arms 411–414 are each about 4 feet long and are formed of rigid 1" pipe. A 10 ft. length of chain 75 is extensible for at least ¼ inch when 1,000 lbs. tensile stress is placed thereon. Except over muddy land, the lower portion 76 of chain 75 is usually slightly slack.

In the modification of station 13 shown in FIGURE 11 assemblies 253 and 263 are respectively, rotatably supported on shafts 154 and 155A for the pinions 54 and 55A of the sprocket wheels 53 and 55.

Assembly 253 comprises a rigid vertical outer plate 251 and a rigid inner vertical plate 252 which are joined together by a series of like bolts as 257 and 258 near periphery of plates 251 and 252. Plates 251 and 252 are located on either side of the sprocket wheel 53 and are rotatably supported on shaft 154. Bolts as 257 are peripheral of the wheel 53.

A guide wheel 255 is rotatably supported between plates 251 and 252 at the top thereof. The entire assembly 253 is rotatably located on shaft 154.

For purpose of illustration the assembly 253 is shown broken away in a small area 254 to show the chain 75 on sprocket wheel 53 and its location relative to plates 251 and 252.

Assembly 263 comprises a rigid vertical outer plate 261 and a rigid inner vertical plate 262 which are joined together by bolts as 267 and 268 near periphery of plates 261 and 262. Plates 261 and 262 are located on either side of the sprocket wheel 55.

A guide wheel 266 is located between plates 261 and 262 at the top thereof. The entire assembly is rotatably located on a shaft 155A.

For assembly 26, the major portion of plate 261 is removed to show the relation of the sprocket wheel 55 and its relationship to the chain 75. One end of a tension spring 259 is attached to one of the bolts as 268 which serve to space apart the plates as 261 and 262.

The other end of the spring 259 is joined to a link chain 269 a portion of which is held by a link 270; link 270 is rotatably attached to a pin as 257 on the assembly 253; free end portion 271 of the chain 269 is located below the link 270 to adjustably provide a definite amount of slack— e.g. 2" to 4" drop in chain portion 76 between wheels 55 and 53 (which are 42½ in. apart center to center) as above described so that the selective application of tractive force to the "front" wheel, as above described in the operation of the apparatus shown in FIGURE 4, still applies, as slack does exist in portion 76. The tension in spring 259 is lowered by lengthening center chain portion 272 to reduce the tension in the portion of the chain, shown as 752, between sprocket 73 and sprocket 55 (and shortened to increase its tension) to maintain greater tension in chain portion 751 (for "front" wheel 60) than there is in 752 for reasons above discussed, whereby substantially all of the tractive force applied by the sprocket 73 to the chain 75 is still applied through portion 751 between the drive sprocket 73 and "front" driven sprocket 53 (sprocket 53 being the "front" when the apparatus shown in FIGURE 11 is moving along the direction of the arrow 67 as shown in FIGURE 11 and in FIGURE 1). The spring 259 and chain 269 increase the tension by the guide wheels 255 and 266, which are rotatably supported in the bolts in assemblies 253 and 263 respectively in the chain portions 751 and 752 when the apparatus shown in FIGURE 11 is moving in the direction of the arrow 67. This avoids excessive amount of looseness in the chain that otherwise might occur where the guide wheels for the "rear" wheel is located while still providing the selective application of tractive force to the wheel to the "front" of the station during its motion, such as shown by the arrow 67 in FIGURE 1. Such spring action softens the shock along chain 75 of the ground resistance to movement of the advance wheel (as 60) by an effective increase in resiliency of the chain system without loss in selective application of force to the "front" wheel.

In the embodiment of apparatus 13 shown in FIGURE 4 further dimensions are:

Center to center distances: Inches
- Sprocket wheel 73 to shaft 155A __________ 48
- Sprocket wheel 73 to shaft 154 __________ 42½
- Shaft 154 to sprocket 155 __________ 42½

Difference between height of lowest point of chain portion 76 and height of point of attachment of chain 76 to wheels 53 and 55 with member 50 level=slack as measured in vertical direction at bottom of chain __________ 3

Center to center distance wheel 0 to wheel 61 position of FIGURES 1 and 11 __________ 60

In embodiment shown in FIGURE 11 with tension in spring 259 of about 10±2 lbs., (adjusted by chain 269) the dimensions above given are the same in view of the intension of keeping the slack in chain portion 76 as above described.

Plates 251, 261, 252 and 262 are imperforate except for holes for bolts as 257 and 258 and 267 and 268 and shafts as 154 and 155A and supports for guide wheels as 255 and 266.

I claim:

1. In a wheeled irrigation apparatus comprising a pipe, frames attached to said pipe, wheels attached to said frames, a motor attached to one of said frames, and a series of serially connected drive shaft portions operatively attached to said motor and extending along said pipe, the improvement which comprises:

(a) that said frames are rigid, a drive sprocket journal is fixedly attached to each said frame near to the top thereof, a drive sprocket shaft is rotatably located in said journal, a drive sprocket wheel is rotatably located on a portion of said shaft; and said shaft portion is in operative series connection with drive shaft portions extending along said pipe to said motor; a clutch means is operatively connected to said sprocket wheel and located on said shaft portion and operatively disengages or engages said drive sprocket wheel and said drive shaft portion, (b) a first lower driven sprocket wheel journal on said frame, a first driven sprocket wheel shaft in said journal, a second driven sprocket wheel firmly attached to said shaft, (c) a second lower driven sprocket wheel journal firmly fixed onto said rigid frame, a second driven sprocket wheel shaft in said journal, and a second driven sprocket wheel firmly fixed to said shaft, (d) said first and second lower driven sprocket wheel being spaced apart from each other in a direction transverse to the length of said pipe and having a plane of rotation lying in the same flat plane as the plane rotation as said first drive sprocket wheel, (e) each of said lower sprocket wheel shafts is firmly connected to a gear wheel, said gear wheel being operatively connected to a ground engaging wheel rotatably attached to said frame, (f) said first drive sprocket wheel joined to said lower driven sprocket wheels by a chain, said chain being extensible and provided with slack between said first, driven sprocket wheel and said second driven sprocket wheel, (g) said drive shaft sprocket journal rotating in a direction opposite to the direction of rotation of the ground engaging wheels on said rigid frame whereby the tension in said chain is greater between said drive sprocket and the driven sprocket connected to the ground engaging wheel which is moving in advance of the other ground engaging wheel and lesser in the portion of chain attached to the sprocket wheel connected to the ground engaging wheel moving to the rear of the other ground engaging wheel.

2. Apparatus as in claim 1 wherein each of said ground engaging wheels has a sprocket wheel firmly attached thereto, said sprocket wheel being of lesser diameter than said ground engaging wheel, an L-shaped wheel supporting axle with a vertical portion which is pivotally located in said frame and, said axle having a horizontal portion joined to the vertical portion and said ground engaging wheel has a journal, said journal being rotatably attached to said horizontal portion of said L-shaped axle, said vertical portion being located in said frame adjacent the level of said horizontal portion of said axle, each of said ground engaging wheels being attached to said frame for rotation about an horizontal axis parallel to the length of said pipe and in a plane spaced away from the plane of rotation of said first and second lower driven sprocket wheels and said first drive sprocket wheel, said sprocket wheel attached to said ground engaging wheel then engaging a gear wheel attached to a lower driven sprocket wheel, whereby said sprocket wheel on said ground engaging wheel is movable into and out of contact with said gear wheel by movement of said ground engaging wheel about said vertical portion of said L-shaped axle while said frame is stationery.

3. Apparatus as in claim 2 wherein there is substantially no tension in said chain between said first driven sprocket wheel and said second driven sprocket wheel and there is tension in said chain between said drive sprocket wheel and said first driven sprocket wheel, whereby tractive force is selectively applied to the ground engaging wheel moving in advance of the other ground engaging wheel.

4. Apparatus as in claim 3 wherein said clutch means is a tooth clutch comprising teeth on said sprocket wheel and a movable sleeve, said movable sleeve being movable longitudinally of said drive sprocket shaft, a shoulder means on said sleeve, said drive shaft also having a shoulder means thereon, said sprocket wheel having teeth extending longitudinally of said drive shaft, said clutch means being movable to a position on said drive shaft whereat said should means on said drive shaft engages said sleeve means and holds said sleeve and the teeth means on said sleeve means at a distance from the teeth on said sprocket wheel, and means in said clutch means urging said sleeve teeth means into engagement with said teeth on said sprocket wheel, said sleeve means also comprising means engaging said drive sprocket shaft.

5. Apparatus as in claim 3 wherein said frame comprises wheel adjustment means fixedly attached to said frame, and each of said ground engaging wheels is pivotally supported in said adjustment means in said frame, said adjustment means comprising means for holding said ground engaging wheel in either of two positions, in one of which the vertical plane of rotation of said ground engaging wheel is parallel to the length of said pipe, and in the other of which positions the vertical plane of rotation of said ground engaging wheel is perpendicular to the length of said pipe.

6. Apparatus as in claim 3 wherein said rigid frame is connected to said pipe at 3 spaced apart points along the length of said pipe by a plurality of rigid elements, each one of which elements extends from a height on that frame below the top of the ground engaging wheel and is firmly connected to that pipe and to another of said element joined to said frame at a point spaced apart from the point of attachment of said one element to said frame.

References Cited

UNITED STATES PATENTS

| | | | |
|---|---|---|---|
| 3,118,514 | 1/1964 | Bowman | 239—212 |
| 3,175,635 | 3/1965 | Bryan | 239—212 XR |
| 3,318,531 | 5/1967 | Funk | 239—212 |
| 3,327,796 | 6/1967 | Hanmer | 239—183 XR |
| 3,353,750 | 11/1967 | Dowd | 239—212 XR |
| 3,355,109 | 11/1967 | Kane | 239—213 |
| 3,385,315 | 5/1968 | Decoto et al. | 239—212 XR |
| 3,415,270 | 12/1968 | Stilwell | 239—212 XR |

SAMUEL SCOTT, Primary Examiner